O. R. EIDE.
GARAGE TURN TABLE.
APPLICATION FILED OCT. 11, 1915.
1,185,640.
Patented June 6, 1916.
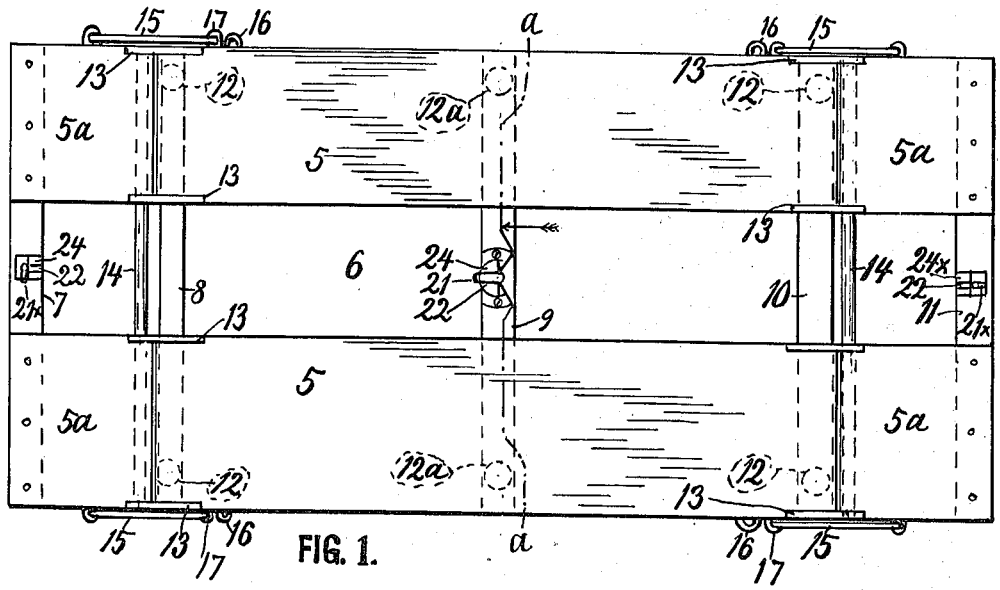
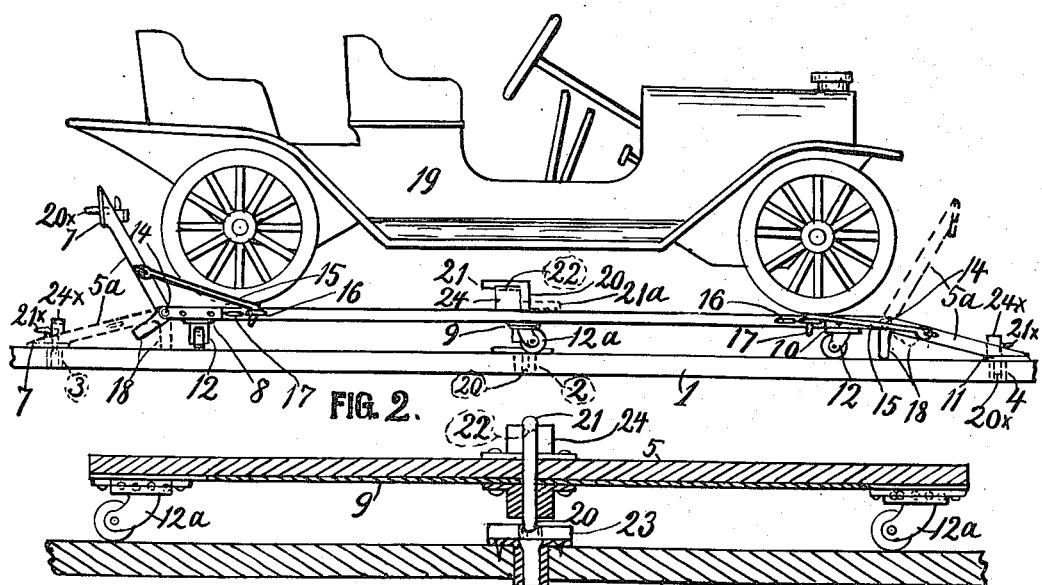
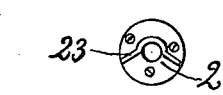
INVENTOR:
Ole R. Eide,
BY his ATTORNEY:
A. M. Carlsen.

UNITED STATES PATENT OFFICE.

OLE R. EIDE, OF ST. PAUL, MINNESOTA.

GARAGE TURN-TABLE.

1,185,640.   Specification of Letters Patent.   Patented June 6, 1916.

Application filed October 11, 1915. Serial No. 55,326.

*To all whom it may concern:*

Be it known that I, OLE R. EIDE, a subject of the King of Norway, who have declared my intention to become a citizen of the United States, residing at St. Paul, in the county of Ramsey and State of Minnesota, have invented a new and useful Garage Turn-Table, of which the following is a specification.

My invention relates to equipments for handling automobiles in garages, and the object is to provide a movable turn-table by which automobiles may readily be turned end for end so as to enter and leave the garage without running backward, and by which the automobile may also be moved laterally and in any desired direction while in the garage so as to get it into the desired place and position for repairing or keeping it.

In the accompanying drawing,—Figure 1 is a top or plan view of the turn table with its end approaches lowered as when ready to receive an automobile or similar car. Fig. 2 is a side elevation of an automobile and one of my turn tables supporting it upon the garage floor. Fig. 3 is an enlarged cross section on the line $x-x$ in Fig. 1 with the garage floor also in section. Fig. 4 is a detail top view of the bushing 2.

Referring to the drawing by reference numerals, 1 designates the garage floor in which are secured three bushings 2, 3 and 4.

The turn table consists of a platform 5 having a large opening 6, and has its parts firmly secured together by cross bars 7, 8, 9, 10 and 11. It is supported on four casters 12, one near each corner of the main body and it may also have two casters $12^a$ to support it intermediate the end casters 12, especially if it is a long and not very thick table. The end portions $5^a$ of the table are hinged to the main part of the table by metal ears 13 and pintle rods 14 so as to form approaches adapted to be lowered with their free ends to the floor, or to be raised upward as shown in Fig. 2 to serve as guards against escape of the automobile from the table. Said approaches are held in raised position by brace-hooks 15 hooked into the eyes or staples 16 as shown in full lines to the left in Fig. 2, and when the approaches are down said hooks rest idle in other staples 17 as shown in full lines to the right in Fig. 2. The approaches are provided with legs 18 adapted, when the platform is down, to rest on the floor directly below the joint formed by the pivot rod 14 and thereby support the joint and the adjacent end of the approaches.

19 designates an automoblie standing upon the turn-table.

The middle portion of the turn-table is provided with a vertically slidable bolt 20 adapted to act as a turn pivot in the bushing 2 in the floor when the table is to be turned end for end; said pivot bolt has its upper end provided with a horizontal handle 21 adapted to rest in a notch 22 in the top of a block 24 when the bolt is raised above the bushing in the floor, and when the bolt is in the bushing said handle occupies the lower position shown in dotted line $21^a$ in Fig. 2 where the block is cut away or does not extend. A block and locking bolt similiar to the one just described is also provided upon each cross bar 7 and 11 of the approaches, the bolts of which when lowered enter into the bushings 3 and 4 and prevent accidental rotation of the table when an automobile enters or leaves the same; said blocks on the approaches are designated by $24^x$ and the handles of the bolts therein by $21^x$.

In the operation of the device, when an automobile enters the garage it is run upon the turn table, the bolts in the approaches are raised above the bushings in the floor, the table turned end for end and the bolts $20^x$ dropped down again. The automobile may thus leave the garage with the front end forward when it is ready to leave. If it is to be placed aside for a longer time and perhaps other automobiles likewise in the garage, the approaches and the bolt 20 are raised, the table pushed to the desired place and position, the car unloaded from it and the table returned to its normal position with the bolts into the floor to hold it while receiving the next car a V-shaped rib 23 assisting in guiding the bolt directly over the bushing 2. This operation is simply reversed when several cars are to leave the garage, except cars which may have been turned and deposited by the table in such positions that they are able to leave the garage with the front end forward.

The turn table is of good service both in large garages and factories and repair shops, and in private garages where each owner keeps his automobile.

What I claim is:

1. A turn table for garages, the same comprising a platform provided with casters to support it, each end of the platform having a hinged approach adapted to be folded with its outer end down to a level with the base of the casters and to be folded upward when so desired, and means for holding the approaches in the raised position, a bushing adapted to be inserted in the floor of the garage and a vertically slidable bolt carried by the middle of the turn table and adapted to enter said bushing, and means for supporting said bolt in raised position above the bushing.

2. A turn table for garages, the same comprising a platform provided with casters to support it, each end of the platform having a hinged approach adapted to be folded with its outer end down to a level with the base of the casters and to be folded upward when so desired, and means for holding the approaches in the raised position, a bushing adapted to be inserted in the floor of the garage and a vertically slidable bolt carried by the middle of the turn table and adapted to enter said bushing, and means for supporting said bolt in raised position above the bushing, and two other bushings adapted to be secured in the garage floor, and blocks and bolts carried by the approaches similar to the one described and adapted to enter said other bushings to prevent rotation of the table when so desired.

3. A turn table for garages, the same comprising a platform provided with casters to support it, each end of the platform having a hinged approach adapted to be folded with its outer end down to a level with the base of the casters and to be folded upward when so desired, and means for holding the approaches in the raised position, said approaches having at their hinged ends means for supporting them on the floor.

4. The combination with a turn-table mounted on casters and having at the middle a vertically slidable pivot bolt or member, and means for holding said member in raised and in lowered positions, of a floor having a vertical sleeve or bushing for the reception of the lower end of the pivot bolt, and a V-shaped guide for guiding the said bolt to central position over the bushing when the turn-table is moved on the casters for purpose of giving it pivotal connection with the floor.

In testimony whereof I affix my signature, in presence of two witnesses.

OLE R. EIDE.

Witnesses:
M. P. MORIARTY,
ROSE CARNIS.